J. G. & E. T. TUSSING.
FISHING BOB.
APPLICATION FILED MAR. 5, 1915.
1,163,285.
Patented Dec. 7, 1915.
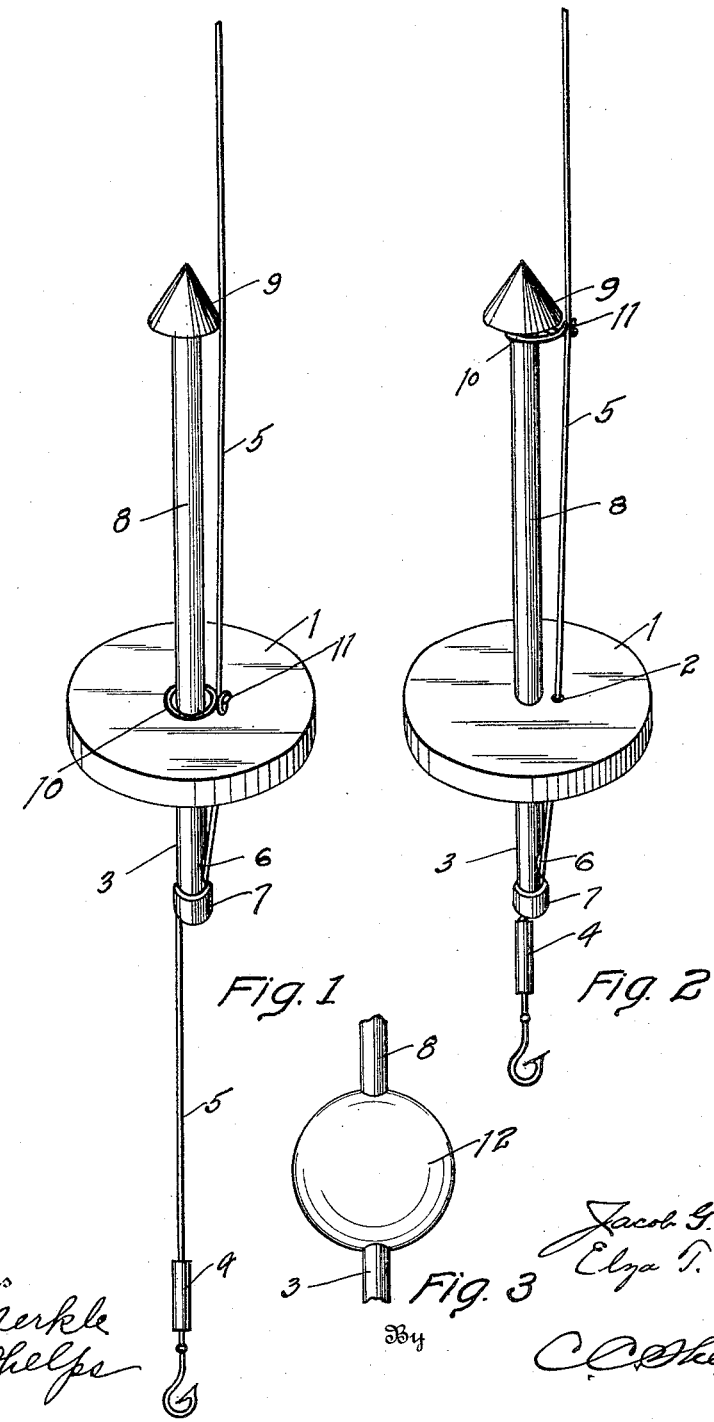

UNITED STATES PATENT OFFICE.

JACOB G. TUSSING AND ELZA T. TUSSING, OF COLUMBUS, OHIO.

FISHING-BOB.

1,163,285.

Specification of Letters Patent.

Patented Dec. 7, 1915.

Application filed March 5, 1915. Serial No. 12,289.

*To all whom it may concern:*

Be it known that we, JACOB G. TUSSING and ELZA T. TUSSING, citizens of the United States, residing at Columbus, in the county of Franklin and State of Ohio, have invented certain new and useful Improvements in Fishing-Bobs, of which the following is a specification.

Our invention relates to fishing bobs and has for its main object the provision of a structure which will at all times keep the bob in a vertically disposed position when floating upon water. It frequently happens that these bobs become tangled with the fishing line when the line is withdrawn when making a catch and this tangling can practically in all instances be traced to the position the bob itself assumes while in the water.

A further object of our invention resides in so forming my structure that the line may be given a certain amount of movement free of the bob in its withdrawing motion. This latter feature also assists materially in guarding against twisting of the line.

The preferred embodiment of our invention is shown in the accompanying sheet of drawings, in which similar characters of reference designate corresponding parts, and in which:

Figure 1 is a view in perspective of one form of our bob, Fig. 2 is a view in perspective of the same type of bob with the line shown in an elevated position, and, Fig. 3 is a view showing a slightly modified form of float portion sometimes used by us.

In Figs. 1 and 2 the float portion is designated by the reference numeral 1, this float portion being in the nature of a disk provided with a transverse aperture shown at 2. Projecting down centrally from the underside of the float portion is a stem designated 3, this stem being of a length to insure the disk 1 of remaining in a horizontal position when in use, by the action of the sinker 4 carried on the lower end of the fishing line 5. This fishing line passes through a downwardly directed hole 6 in the lower end of the stem and also passes through the aperture 2 in the float portion as is indicated. The lower end of the stem 3 may be reinforced with a ferrule shown at 7. The upper side of the float portion 1 is also provided with a centrally disposed stem 8, the upper end of this stem terminating in a stop portion 9. Encircling and slidably mounted on the stem 8 is a slide member 10 preferably made of wire whose ends are so shaped and twisted as shown at 11, that they will rigidly grip the line itself.

When the bob is thrown into the water, the sinker 4 will naturally carry the line 5 to the depth required for fishing. The weight of this sinker will naturally hold the lower end of the stem 3 in a true vertical position because of the hole 6 and this will naturally keep the float portion 1 in a horizontal position. When the line is withdrawn, as when making a catch, the line is given an initial movement, but the bob itself is withdrawn by means of the slide member 10 in its embracing engagement with the upwardly projecting stem 8. This slide member will move on the stem 8 until it engages the stop 9, at which time the bob will also be removed.

In Fig. 3, we have shown a slightly different shape of float portion, the reference numeral 12 indicating a spherical member designed to replace the disk portion 1, as shown in Figs. 1 and 2. The spherical shaped float will remain steady in the water that is a little choppy, whereas the disk-shaped float would tend to take up the motion of the water.

What we claim is:

1. A fishing bob comprising a disk shaped float portion, a stem projecting down centrally from the underside of said float portion, and a stem projecting up centrally from the top side of said float portion.

2. A fishing bob comprising a float portion, a stem projecting down centrally from the underside of said float portion, said stem being arranged to slidably carry the fishing line, a stem projecting up centrally from the top side of said float portion, a stop on the upper end of said last named stem, and a slide member encircling and slidable on said last named stem and rigidly gripping said line.

3. A fishing bob comprising a float portion, a stem projecting down centrally from the underside of said float portion, said stem having a downwardly directed hole through its lower end and said float portion having an aperture therein both adapted to have the fishing line pass through them, a stem projecting up centrally from the top side of said float portion, a stop on the upper end of said last named stem, and a slide member encircling and slidable on said last named stem and rigidly gripping said line.

In testimony whereof we affix our signatures in presence of two witnesses.

JACOB G. TUSSING.
ELZA T. TUSSING.

Witnesses:
 WALTER E. L. BOCK,
 A. L. PHELPS.

Copies of this patent may be obtained for five cents each, by addressing the "Commissioner of Patents, Washington, D. C."